D. BOURQUE.
STUD AND SOCKET FASTENER.
APPLICATION FILED APR. 11, 1918.
1,300,337. Patented Apr. 15, 1919.
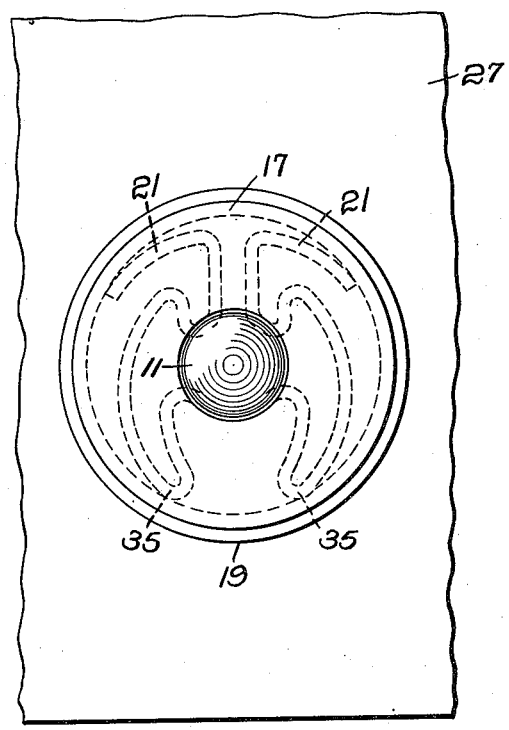
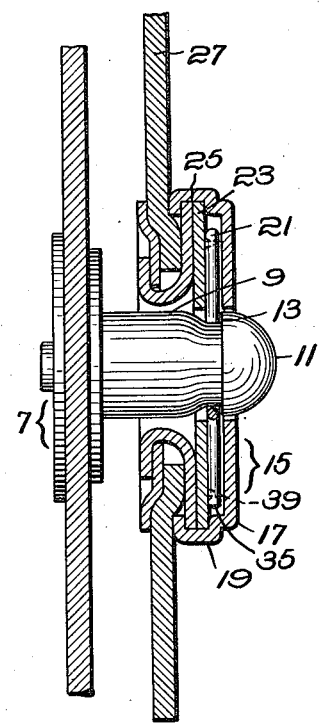
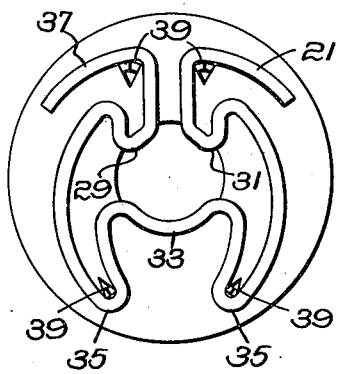
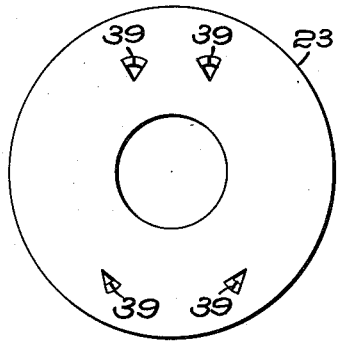
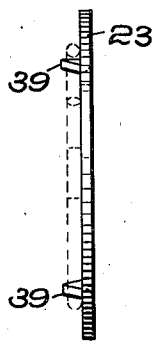
Inventor:
David Bourque.
by Emery, Booth, Janney & Varney
Attys.

UNITED STATES PATENT OFFICE.

DAVID BOURQUE, OF AMESBURY, MASSACHUSETTS, ASSIGNOR TO G. W. J. MURPHY COMPANY, OF AMESBURY, MASSACHUSETTS, A CORPORATION OF MASSACHUSETTS.

STUD-AND-SOCKET FASTENER.

1,300,337. Specification of Letters Patent. Patented Apr. 15, 1919.

Application filed April 11, 1918. Serial No. 227,959.

*To all whom it may concern:*

Be it known that I, DAVID BOURQUE, a citizen of the United States, and resident of Amesbury, in the county of Essex and State of Massachusetts, have invented an Improvement in Stud-and-Socket Fasteners, of which the following description, in connection with the accompanying drawings, is a specification, like characters on the drawings representing like parts.

This invention relates to stud and socket fasteners such as are used, for example, to secure the curtains of motor cars and the purpose is to provide an improved device which will be securely held against accidental separation but which may be readily separated by a simple voluntary manipulation.

My invention will be best understood by reference to the following description of the single specific embodiment thereof chosen for purposes of illustration in the accompanying drawings wherein:

Figure 1 is a front elevation of the fastener with the parts assembled;

Fig. 2 is a vertical diametrical section therethrough;

Fig. 3 is an elevation of the washer and the spring jaws of the socket carried thereby;

Fig. 4 is a similar view of the washer alone; and

Fig. 5 is an edge view thereof.

Referring to Fig. 2 of the drawings, my improved fastener comprises a stud member 7 which may be secured in any desired manner either to a rigid support, as for example, to part of the body of a motor car, or to a curtain, and which comprises a long shank 9 terminating in an enlarged, exteriorly rounded head 11 which may be joined to the shank 9 by an abrupt annular shoulder 13. The significance of the word long as applied to the shank will later appear. By abrupt shoulder I mean one making a sharp angle with the axis of the stud. Herein this angle is a right angle and an element engaged behind the shoulder will be positively held against withdrawal. The shoulder might also be undercut or disposed at such an angle that the greater component of a force pulling an element against the same would directly resist its withdrawal.

The socket member 15 may comprise a substantially cylindrical casing having a front or outer wall 17 and a stopped flange 19. This casing receives spring jaws 21 conveniently formed from a single piece of spring wire and the form of which I will hereafter more fully describe. These jaws are herein secured between the front 17 of the casing and a washer 23 resting against the shoulder of the flange 19 and secured thereto by the inturned extremity thereof, as shown in Fig. 2. I have in the present instance shown a tubular rivet 25 also secured by this portion and which serves for fastening the socket to the curtain 27.

Referring to Fig. 3, the locking jaws herein shown are formed of a suitable spring wire bent to form three or more (herein three) bowed portions 29, 31 and 33, substantially symmetrically arranged around the center line of the socket and forming jaws for engaging behind the head 11 of the stud. In the form herein shown the extremities of the wire and the curved portions 35 are adapted to engage the outer wall of the socket which thus positions the jaws within the casing. Each of the jaws is adapted to yield outwardly from the center of the casing, such yielding being substantially radial thereof. The yielding of the jaws 29 and 31 is accompanied by a bending of the terminal portions 37 of the wire, and the yielding of the jaw 33 (downwardly, viewing Fig. 3) by a bending of the sides of the bow (between portions 35) which forms that jaw.

It will be recalled that in describing the stud member 7 it was referred to as provided with a long shank. Referring to Fig. 2, by long I refer to a shank of such length as will provide a clearance between the base of the stud and the socket when they are assembled, so as to permit the latter to be tipped at a sharp angle to the former. To assemble the stud with the socket it is necessary merely to insert the outwardly rounded, enlarged head 11 through the opening in washer 23, permitting it to press apart the three jaws 29, 31 and 33 which will snap in behind the shoulder 13. Conveniently I may so proportion the strength of the spring that the limit of yielding is less than the maximum diameter of the head 11 but greater than the distance measured diametrically from the outer margin of the head on one side to the base of the shoulder 13 on the other. In this case the socket would be pressed over the head in a somewhat sliding position to permit the jaws on one side to pass the shoulder first. However, when the shoulder is square or markedly abrupt, as in the present instance, such proportioning of the strength of the jaws is not necessary.

The parts being assembled as described, they are locked against accidental disengagement since ordinary strains on the curtain 27 draw the socket substantially axially outward. Under these circumstances the jaws engaging the abrupt shoulder 13 interpose a positive resistance. Or, if the strength of the wire is proportioned as described, the symmetrical spreading of the jaws due to such a strain will not be sufficient to allow them to pass over the head. If it is desired, however, voluntarily to release the fastening, the lower margin of the curtain 27 may be seized and the socket given an abrupt tipping movement which will naturally be accompanied by a pulling movement. This sharp tipping movement is permitted by the clearance provided by the long shank. Under these circumstances, assuming the parts to be as shown in the drawings, the outward pull on the socket will force the head upwardly against jaws 29 and 31 which will yield outwardly and the jaw 33 will be drawn clear of the shoulder 13 and will be tipped over the same permitting the socket to be withdrawn from the head somewhat in the manner of a buttonhole from a button.

This tipping movement is here described as performed from below the stud but it can take place from any side, a fact which is of considerable advantage especially when, in a motor car for example, an occupant reaches from the inside to disengage the fastening of a storm curtain or the like. It will be noted that there are three or more jaws provided and that they are substantially symmetrically arranged and yield outwardly in a generally radial direction. On account of this construction the fastener can be released, if desired, from any side since two jaws will yield outwardly and permit the fastener to be tipped to move the remaining jaw over the edge of the head.

I have discovered that if a fastener is constructed as so far described, difficulty is sometimes encountered because when two jaws yield outwardly the other will be drawn after or will follow after them, the result being essentially a shifting of position of the entire jaw system without appreciable change in the size of the opening defined by the several jaws. I therefore provide means to prevent such inward movement of the jaws and herein the bent wire is centrally suspended in the casing by means of struck up portions 39 on washer 23 which are adapted to engage the inner side of the wire at the bases of the bowed portions 29, 31 and 33. Thus, while the outward yielding of each jaw is unimpeded, accompanying inward movement of the opposite jaw is prevented. The described action of the fastener to permit one of the jaws to be withdrawn over the edge thereof is thus insured.

Preferably, as herein shown, the socket member is made round in plan. This is an advantage since as a matter of appearance it is then immaterial in what way it is secured to the curtain. As a matter of function it is immaterial because of the arrangement of the three or more jaws for outward yielding, since this permits the fastener to be opened in the described manner from any side. The fastener is usually opened from the bottom of the curtain. In certain types of fasteners as now used it is necessary accurately to position the socket with relation to this edge of the curtain. With the fastener herein disclosed such difficulty is avoided.

The struck up portions 39 serve to space the washer from the front wall of the casing and I may therefore, if desired, dispense with the shoulders here shown for receiving the washer.

Having thus explained my invention, what I claim as new and desire to secure by Letters Patent is:—

1. In a stud and socket fastener, a stud having a long shank and an abruptly shouldered head, a socket including a casing, jaws in the casing yieldable outwardly from the center thereof and means to prevent inward movement of the jaws.

2. In a stud and socket fastener, a stud having a long shank and an abruptly shouldered head, a socket including a casing, a wire in the casing bent to provide a set of jaws presented to the stud and yieldable substantially radially outwardly therefrom and means to suspend the wire in the casing.

3. In a stud and socket fastener, a stud having a long shank and an enlarged head, a socket including a casing, jaws in the casing yieldable outwardly from the center thereof and designed for a limit of yielding to provide an opening less than the maximum dimension of the head and means to prevent inward movement of the jaws.

4. In a stud and socket fastener, a stud having a long shank and an abruptly shouldered head, a socket coöperating therewith comprising a casing, a wire bent to provide three or more bowed portions for engagement with said head and projections from a wall of said casing engaging the inner side of the wire at the bases of said bowed portions.

5. In a stud and socket fastener, a stud having a long shank and an abruptly shouldered head, a substantially cylindrical socket coöperating therewith comprising a front wall and a flange, a washer engaging the flange and defining with said front wall a jaw receiving chamber, projections struck from said washer, and a spring wire suspended by said projections and bent to provide three or more jaws presented to the center of the casing for engagement with the stud.

6. A fastener socket comprising a cup-like casing, an annular washer received therein and having projections contacting with the front wall or bottom of the cup and a spring wire bent to form jaws presented adjacent the opening in said washer, said wire suspended from said projections.

In testimony whereof, I have signed my name to this specification.

DAVID BOURQUE.